United States Patent [19]
Tang et al.

[11] Patent Number: 6,078,122
[45] Date of Patent: Jun. 20, 2000

[54] RELUCTANCE MACHINE WITH FRACTIONAL PITCH WINDING AND DRIVE THEREFORE

[75] Inventors: Yifan Tang; Yue Li, both of St. Louis, Mo.

[73] Assignee: Emerson Electric Co., St. Louis, Mo.

[21] Appl. No.: 09/281,106

[22] Filed: Mar. 29, 1999

Related U.S. Application Data

[63] Continuation of application No. 08/680,516, Jul. 9, 1996, Pat. No. 5,889,347.

[51] Int. Cl.$^7$ ................................ H02K 3/28; H02P 8/00
[52] U.S. Cl. ...................... 310/165; 310/162; 310/180; 310/166; 318/701
[58] Field of Search ............................. 318/701; 310/162, 310/163, 166, 168, 179, 180, 165, 184

[56] References Cited

U.S. PATENT DOCUMENTS

| | | | |
|---|---|---|---|
| 4,918,347 | 4/1990 | Takaba | 310/179 |
| 5,010,267 | 4/1991 | Lipo et al. | 310/162 |
| 5,545,938 | 8/1996 | Mecrow | 310/156 |

FOREIGN PATENT DOCUMENTS

| | | | |
|---|---|---|---|
| 5-219786 | 8/1993 | Japan | H02P 7/00 |
| 7-143697 | 6/1995 | Japan | H02K 3/28 |
| 760322 A | 9/1980 | U.S.S.R. | H02K 3/28 |
| 2 262 843 | 6/1993 | United Kingdom | H02K 3/18 |
| WO80/02216 | 10/1980 | WIPO | H02K 19/24 |

OTHER PUBLICATIONS

Abstract to SU 1070651 A of Jan. 30, 1984.
International Search Report dated Nov. 7, 1997, for corresponding International Patent Application No. PCT/US97/11827 of Jul. 8, 1997.
Stephenson and Blake, "The Characteristics, Design and Application of Switched Reluctance Motors and Drives," Jun. 1993, Nuremberg, Germany.
B.C. Mecrow, "Fully Pitched–Winding Switched–Reluctance and Stepping–Motor Arrangements," Jan. 1993, IEE Proceedings–B.
P.G. Barrass, et al., "Bipolar Operation of Fully–Pitched Winding Switched Reluctance Drives," Sep. 11–13, 1995, IEE Conference Publication No. 412.
P.G. Barrass, et al., "The Unipolar Operation of Fully Pitched Winding Switched Reluctance Drives," 1994, ICEM Conference Proceedings.
B.C. Mecrow, "New Winding Configurations for Doubly Salient Reluctance Machines," Oct., 1992, IEEE Industrial Applications Society.

*Primary Examiner*—Nestor Ramirez
*Assistant Examiner*—B Mullins
*Attorney, Agent, or Firm*—Howrey Simon Arnold & White, LLP

[57] ABSTRACT

A reluctance machine including a plurality of phase windings where each phase winding comprises a plurality of fractional-pitched coils. The reluctance machine may be coupled to a drive that can energize one, two or more of the phase windings to provide output torque that is derived from: (i) the self-inductances of the phase windings; (ii) a combination of the self-inductances of the phase windings and the mutual inductances between the phase windings; or (iii) the mutual inductances between the phase windings.

26 Claims, 17 Drawing Sheets

RELUCTANCE MACHINE WITH FRACTIONAL PITCH WINDING AND DRIVE THEREFORE

This is a continuation of application Ser. No. 08/680,516 filed Jul. 9, 1996 now U.S. Pat. No. 5,889,347.

FIELD OF THE INVENTION

This invention relates to reluctance machines and machine systems and, in particular, to switched reluctance machines and machine systems. More specifically, the present invention relates to winding configurations for reluctance machines and drives for such machines.

BACKGROUND OF THE INVENTION

In general, a reluctance machine is an electric machine in which torque is produced by the tendency of a movable part to move into a position where the inductance of an energized phase winding is maximized. In one type of reluctance machine the energization of the phase windings occurs at a controlled frequency. These machines are generally referred to as synchronous reluctance machines. In another type of reluctance machine, circuitry is provided for detecting the position of the movable part (generally referred to as a "rotor") and energizing the phase windings as a function of the rotor's position. These types of machines are generally known as switched reluctance machines. The present invention is applicable to both synchronous and switched reluctance machines.

The general theory of the design and operation of reluctance machines in general, and switched reluctance machines in particular, is known in the art and is discussed, for example, in Stephenson and Blake, "The Characteristics, Design and Applications of Switched Reluctance Motors and Drives", Presented at the PCIM '93 Conference and Exhibition at Nuremberg, Germany, Jun. 21–24, 1993.

Most reluctance machines include a stationary member, called a "stator", that comprises a plurality of stacked laminations that include a number of projections (or "stator teeth") that define a plurality of discrete stator poles. Wire coils, typically copper, are placed within the gaps between the stator teeth to form one or more phase windings. The most common winding arrangement used to construct reluctance machines is the "single tooth" winding arrangement in which each stator tooth is surrounded by a single coil of wire. The various coils may then be linked together in series or parallel fashion to form one or more phase windings.

FIG. 1 provides a simple illustration of a traditional "single-tooth" reluctance machine comprising a six-pole stator 10 and a four-pole rotor 12. The laminations that comprise the stator have six inwardly projecting stator teeth 13–18 that define six stator poles. Each stator tooth 13–18 is surrounded by an individual coil of wire $a_1$, $a_2$, $b_1$, $b_2$, $c_1$ and $c_2$ and the coils surrounding stator teeth are electrically connected to form three phase windings A, B and C. The placement of the coils is reflected by the dots and crosses of FIG. 1 in which the crosses represent wire portions where positive electric current flows into the page and the dots represent wire portions where positive electric current flows out of the page. In typical operation of a single-tooth reluctance machine, each phase winding is energized for an interval corresponding to one-third of one complete rotor rotation such that each phase winding contributes to positive torque production one-third of the time.

Single-tooth reluctance machines, such as the one illustrated in FIG. 1, are somewhat limited in that the mechanism for torque production in such machines is exclusively a function of the self inductance of each energized phase winding. Because of the single-tooth nature of the windings, there is no mutual coupling between the machine phases and, thus, there is no significant torque production resulting from changes in the mutual inductances between the phase windings. As such, the maximum torque output and efficiency of reluctance machines with single-tooth windings is limited because the useful interval of such a winding is limited to those periods when the self inductance for that winding is increasing.

Despite the potential limitations of single-tooth winding configurations, the conventional wisdom of those working in the area of reluctance machines is that single-tooth windings are desirable because mutual inductance between the phase windings is, as a general matter, undesirable. The entrenched bias is expressed in publications concerning reluctance machines, including A. Hughes et al, "Effect of Operating Mode on Torque-Speed Characteristics of a VR Motor presented at the July 1976 International Conference on Stepping Motors and Systems" at Leeds University, Leeds, England, which contends that mutual inductance between phases diminishes the available torque production of three-phase reluctance machines with standard uni-polar excitations.

In contrast with the single-tooth machines discussed above—where there is no significant mutual inductance and all torque is produced as a function of self inductance—reluctance machine designs have been proposed where there is no self inductance and torque production is exclusively a function of changes in the mutual inductance between the phase windings. Such reluctance machines use fully-pitched winding arrangements. In general, a fully-pitched winding is a winding including winding coils that span M stator poles, where M is an integer equal to the number of phase windings. One such design was proposed by B. C. Mecrow in his paper entitled, "New Winding Configuration for Doubly Salient Reluctance Machines," published at the October 1992 IEEE Industry Applications Society Annual Meeting held in Houston, Tex.

FIG. 2 illustrates a reluctance machine using a fully-pitched winding of the type disclosed in the referenced Mecrow paper. In general, the machine includes a six-pole stator 20 and a four pole rotor 22 that are substantially identical in construction to the rotor 10 and stator 12 of the single-tooth machine of FIG. 1. The primary difference between the single-tooth machine of FIG. 1 and the fully-pitched machine of FIG. 2 is the placement and arrangement of the windings. In the fully-pitched machine of FIG. 3, there are only three winding coils a, b and c, and each coil is positioned within the stator such that the ends of the coils in the inter-pole gaps are offset from one another by 180 mechanical degrees for the illustrated six stator pole/four rotor pole design. Because of the fully-pitched nature of the windings of the machine of FIG. 2, virtually all of the torque production occurs as a result of changes in the mutual inductances between the two windings. As explained in the Mecrow paper, in such a machine, each phase winding is energized over a period covering two thirds of a complete rotor revolution such that each phase winding contributes, through changes in the mutual inductances between the two windings, to positive torque production for a period corresponding to two-thirds of each rotor rotation.

According to the referenced Mecrow paper, this fully-pitched, mutual-inductance only machine results in better utilization of the electromechanical circuit formed by the machine. Variants on Mecrow's fully-pitched reluctance machine are all discussed in P. G. Barrass, B. C. Mecrow & A. C. Clothier, "The Unipolar Operation of a Fully Pitched Winding Switched Reluctance Drives"; B. C. Mecrow, "Fully pitched-winding switched-reluctance and stepping-motor arrangements," IEE Proceedings-B, Vol. 40, No. 1 (January 1993); P. G. Barrass, B. C. Mecrow, & A. C. Clothier, "Bi-polar Operation of Fully-Pitched Winding Switched Reluctance Drives," International Conference on Machines and Drives (September 1995); and U.K. Patent GB 2,262,843 B, "Doubly salient reluctance machines."

The fully-pitched nature of the windings in a fully-pitched reluctance machine causes the various phase windings to have a fairly high self inductance when compared to the inductance of the phase windings in a single-tooth reluctance machine. This relatively high self inductance limits the rate of change of the current in the phase windings and thus restricts the speed at which the phase current can increase from zero to the peak value—and thus to the peak torque producing value. Accordingly, the fully-pitched nature of the windings in fully-pitched machine results in a "high self-inductance penalty" in that the drive used to power the motor must be sufficiently large to drive the currents to their desired value in an acceptable amount of time or the performance of the machine must be compromised because of the limitations placed on the phase current waveforms by the relatively high self inductance.

A further drawback of fully-pitched machines is that the amount of end-turn copper that is required to construct the fully-pitched coils used to form the phase windings. Such large and long end-turns result in increased manufacturing costs that can be directly tied to the amount of copper in the windings. Moreover, the relatively large amount of copper that is necessary to construct such fully-pitched windings results in increased resistance or copper losses during the normal operation of the machine.

It is an object of the present invention to provide an improved reluctance machine that overcomes the referenced and other limitations of single-tooth and fully-pitched reluctance machines.

SUMMARY OF THE INVENTION

The present invention overcomes the described and other limitations of traditional reluctance machines by providing a reluctance machine having a stator that includes a plurality of phase windings where each phase winding comprises a number of electrically connected "fractional-pitched" coils. The coils are fractional-pitched in that they have a pitch that is between the limited pitch of a single-tooth coil and that of a fully-pitched coil. The fractional-pitch nature of the coils of the machines of the present invention allows both the self inductance of the phase windings and the mutual inductances between the phase windings to contribute to the torque output of the machine.

Depending on the positioning of the fractional-pitch coils within the stator, the mutual inductances between the phase windings can either be symmetric (e.g., of the same polarity and form but out of phase) or non-symmetric (e.g., not of the same polarity and form). If the fractional-pitched windings are non-symmetric, the energization currents necessary to provide output torque as a function of self and mutual inductances will vary in form between the three phase windings. If the fractional-pitch windings are symmetric, the energization currents necessary to provide torque output as a function of both self and mutual inductances or just mutual inductances, may be of the same form but out of phase by a given amount.

The present invention also relates to methods for energizing reluctance machines having fractional-pitched windings as described above.

The various attributes of the present invention may be understood from a review of the figures contained in this specification which are summarized below.

BRIEF DESCRIPTION OF THE DRAWINGS

Similar reference characters indicate similar parts throughout the several views of the drawings.

DETAILED DESCRIPTION OF THE INVENTION

Figure 3:
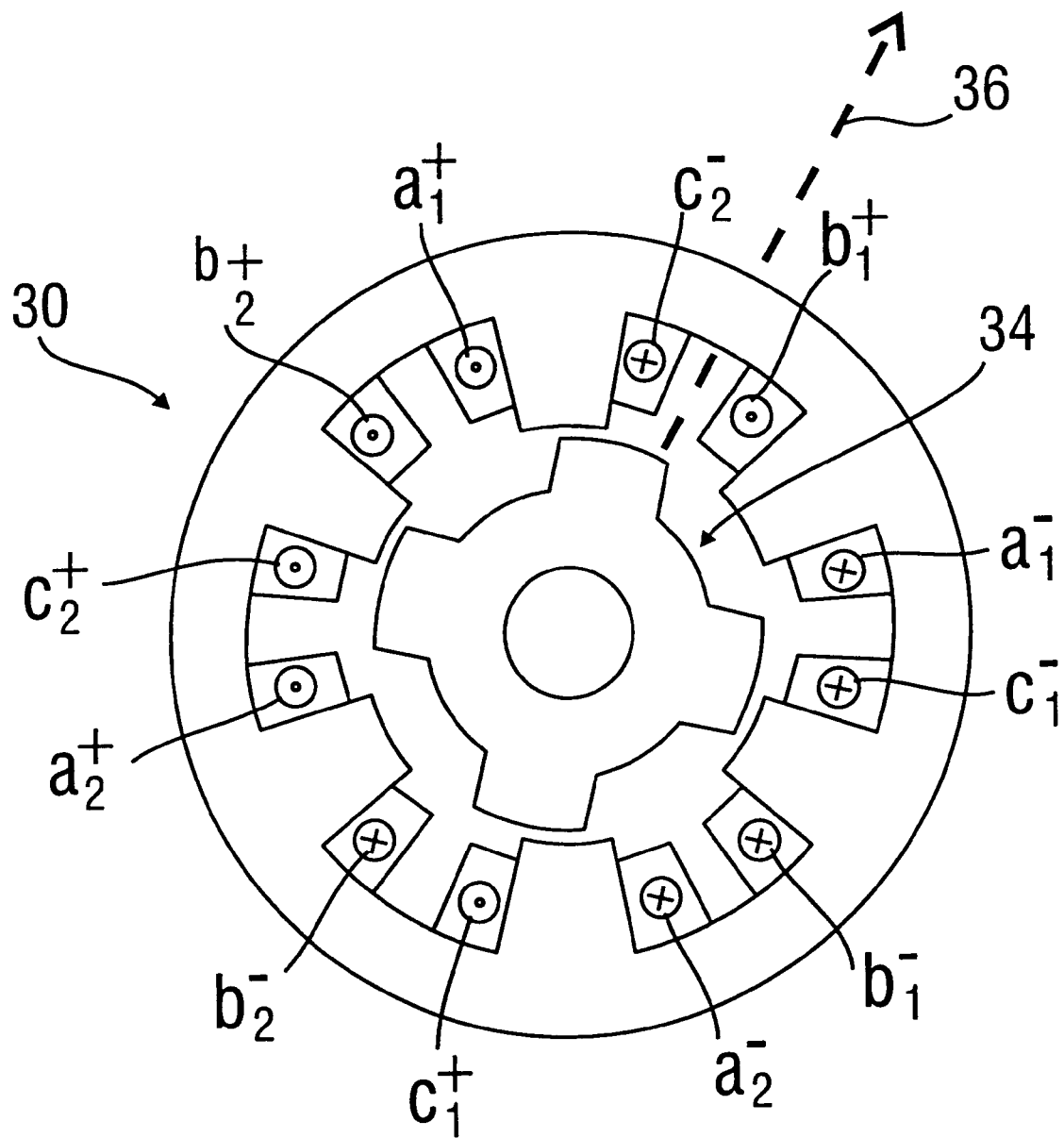
FIG. 3 illustrates a six stator pole, four rotor pole reluctance machine in accordance with the present invention having fractional-pitched windings.

Turning to the drawings, and in particular FIG. 3, a reluctance machine 30 in accordance with the present invention is illustrated. In general, reluctance machine 30 includes a stator 32 defining six inwardly directed stator poles and a rotor 34 defining four outwardly extending rotor poles. The stator 32 and the rotor 34 may be constructed from a plurality of laminations of appropriate material, e.g., steel, and the basic construction of the stator 32 and the rotor 34 laminations may be accomplished using standard techniques for constructing such elements for a reluctance machine.

While the laminations that comprises stator 32 and rotor 34 may be standard, the winding arrangement of machine 30 is not. In figure 30 there are three-phase windings A, B and C, with each phase winding made up of two coils such that phase winding A comprises coils $a_1$ and $a_2$, phase winding B comprises coils $b_1$ and $b_2$ and phase winding C comprises coils $c_1$ and $c_2$. The two coils that make up the phase windings may be connected in series or parallel. In the example of FIG. 3, the coils comprising each phase winding are connected in parallel. For machines having a different stator pole/rotor pole combination (e.g., N×6/N×4), the coils that comprise a given phase winding may be connected through a combination of series and parallel connections.

As illustrated in FIG. 3, the coils that comprise each phase winding are not "single-tooth" coils because they encircle more than a single stator. Moreover, the coils that comprise the phase winding are not fully-pitched coils. Instead, each of the coils in the embodiment 30 of FIG. 3 is a "fractional-pitch" coil that spans (or stator poles) more teeth than a single tooth coil but fewer teeth than a fully-pitched coil.

The precise arrangement and orientation of the fractional-pitch coils of the machine 30 of FIG. 3 is expressed by the dot and cross identifiers. The convention used in the Figure is such that if the dot and the cross are viewed as components of an arrow, positive electrical current would flow from the back (or tail) end of the arrow (the cross) through to the point end of the arrow (the dot). This positive electric current would result in the production of a magnetic field that "following the right-hand rule" would have a north pole corresponding to the direction the thumb of a hand would point if the fingers of the hand followed the arrow with the tips of the fingers pointing in the direction of the tip of the arrow. Thus, positive electric current flowing through coil $a_1$ would result in a magnetic field having a north pole in the direction of the dotted arrow 36 illustrated in FIG. 3. Similar magnetic fields would be established from positive energization of the other coils.

Because of the fractional-pitched nature of the coils that comprise the windings A, B and C, there is a change in the self inductance of each winding and in the mutual inductance between the windings as the rotor 34 rotates within the stator 32. Accordingly, when the phase windings are properly energized both mutual and self inductance contributions to the output torque can be realized.

Figure 4:
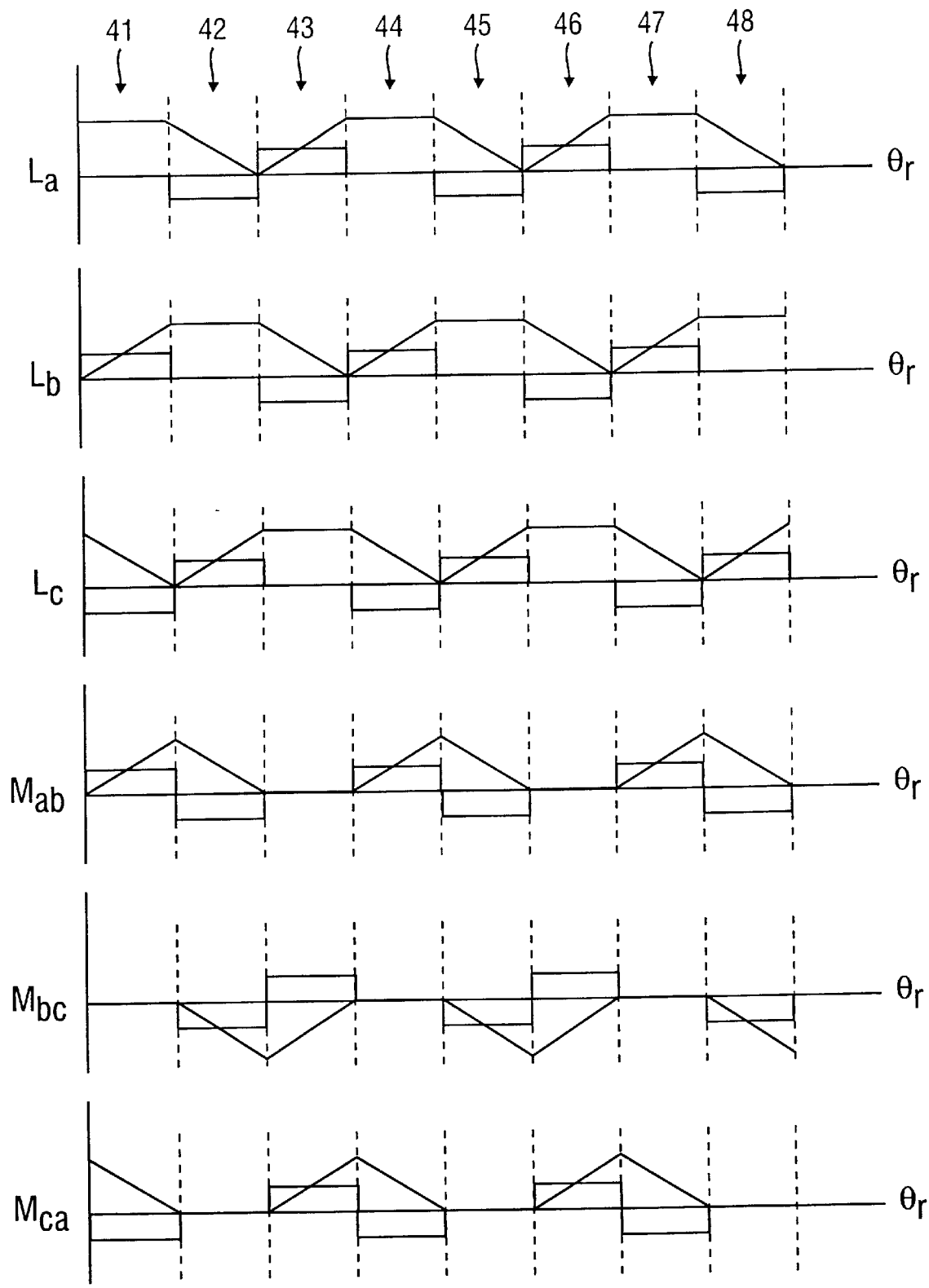
FIG. 4 illustrates the self inductance of the three phase windings of the machine of FIG. 3 and the mutual inductances between the three phase windings as a function of the angular position of the rotor.

FIG. 4 illustrates the self inductances $L_A$, $L_B$, $L_C$ of the three-phase windings A, B and C of the machine 30 of FIG. 3 and the mutual inductances Mab, Mbc and Mca between the respective phase windings as a function of the angular position of the rotor θr. The derivatives of the various self inductances and mutual inductances as a function of the rotor's angular position are also illustrated.

For the three-phase reluctance machine 30 of FIG. 3, the torque output of the machine may be approximated by the following equation, Equation (1):

$$T_{out} = \frac{1}{2}i_A^2 \frac{\partial L_A}{\partial \theta_r} + \frac{1}{2}i_B^2 \frac{\partial i_B}{\partial \theta_r} + \frac{1}{2}i_C^2 \frac{\partial i_C}{\partial \theta_r} + i_A i_B \frac{\partial M_{AB}}{\partial \theta_r} + i_B i_C \frac{\partial M_{BC}}{\partial \theta_r} + i_C i_A \frac{\partial M_{CA}}{\partial \theta_r}$$

where $i_A$, $i_B$ and $i_C$ represent the current flowing in the phase windings A, B and C and where the first three variables in the equation correspond to the total self-inductance torque contribution and where the last three variables in the equation correspond to the mutual-inductance torque contribution.

As a review of FIG. 4 and Equation (1) reveals, the phase energization currents flowing in the phase windings of the machine 30 of FIG. 3 may be controlled such that the total torque output is either completely a result of self-inductance torque, a result completely of the mutual-inductance torque, or a combination of the two.

Figure 1:
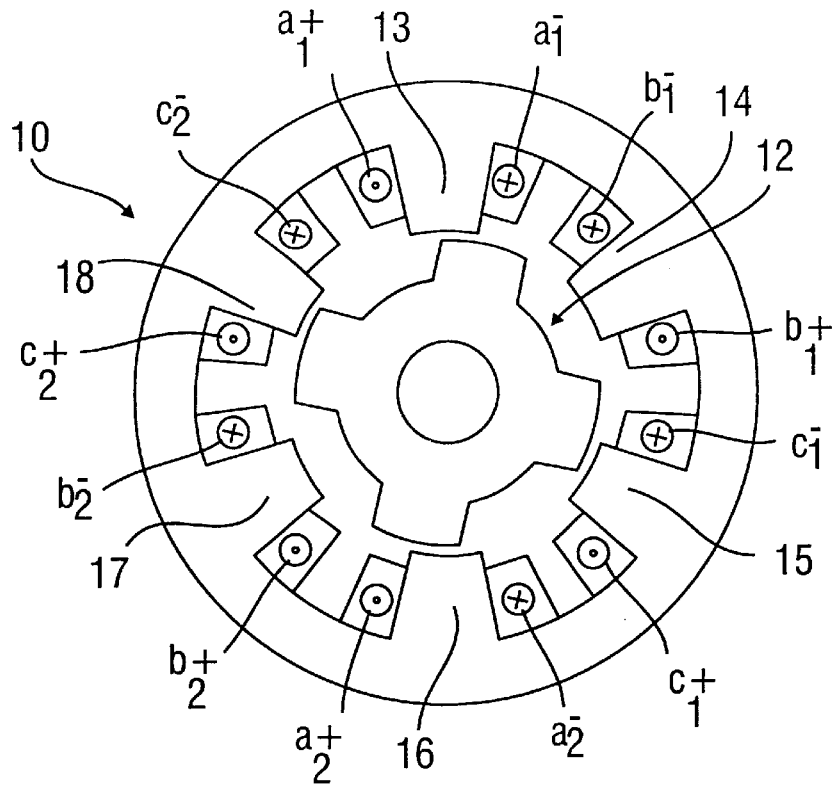
FIG. 1 illustrates an example of a traditional "single-tooth" reluctance machine.
Figure 2:
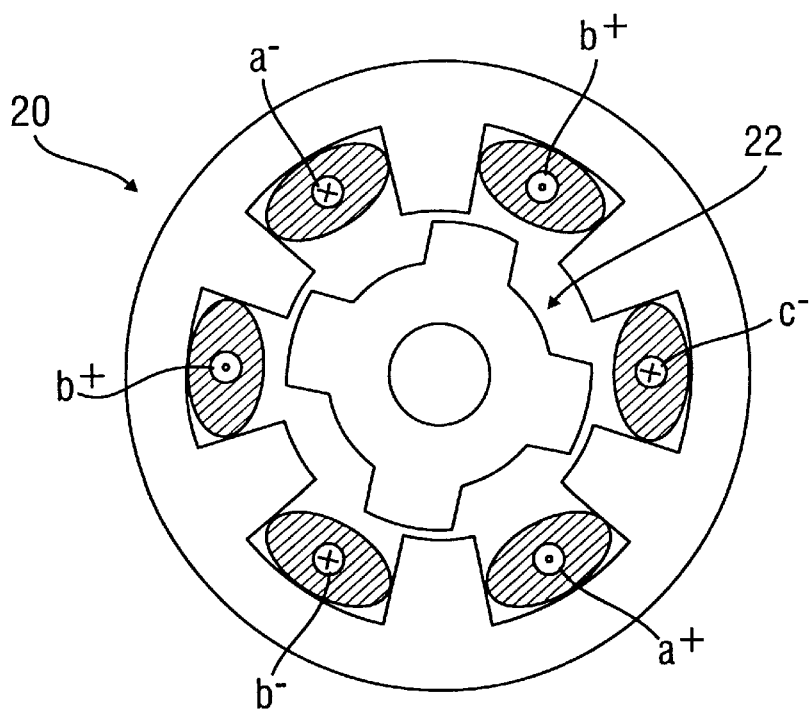
FIG. 2 illustrates a reluctance machine having fully-pitched windings.
Figure 5:
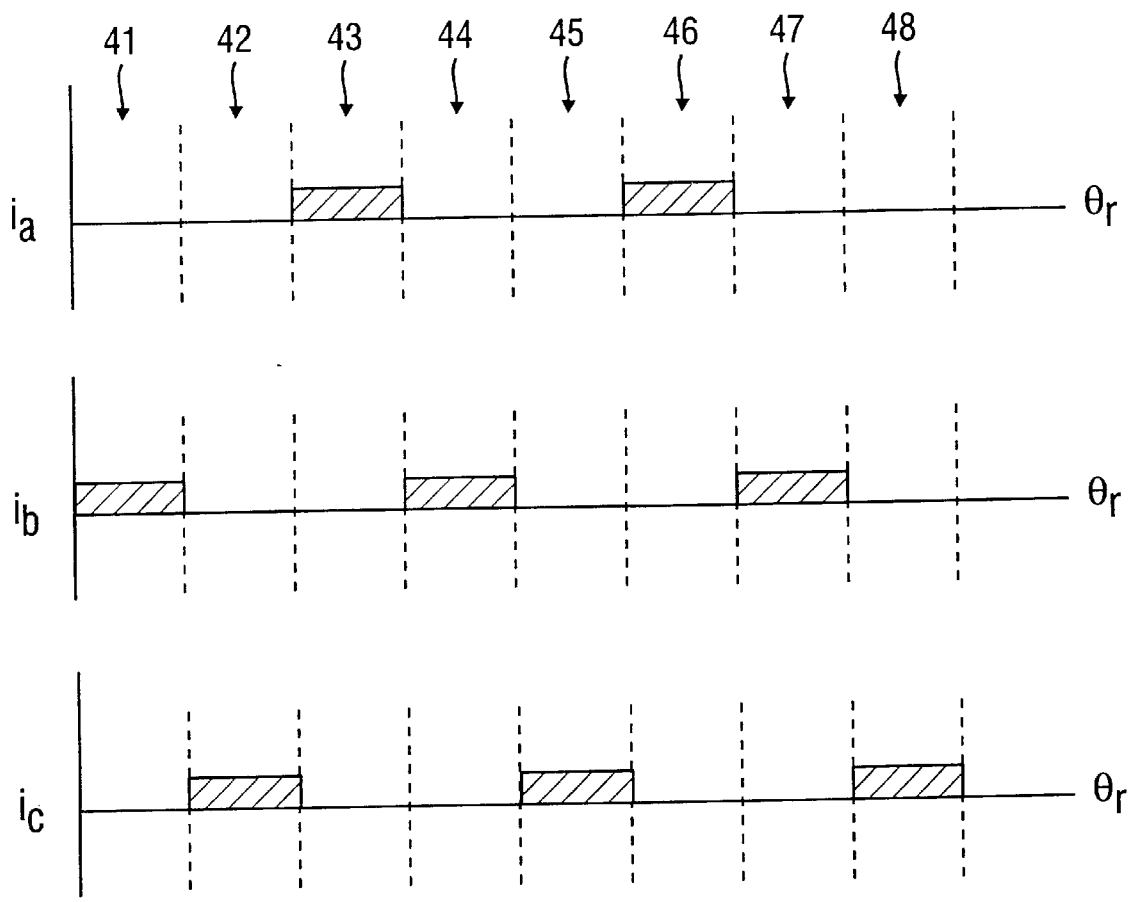
FIG. 5 illustrates an exemplary "single-phase" energization scheme that may be used to drive the machine of FIG. 3 such that only one phase winding is energized at a given time.

FIG. 5 illustrates one current switching scheme that may be used to drive the machine 30 of FIG. 1 such that only one phase winding is energized at a given time and such that all of the torque output is a result of self inductance. In this particular switching scheme, because only one phase winding is energized at a given time, one of the current variables in each of the last three variables in Equation (1) will always be zero such that there is no mutual-inductance torque produced under this scheme.

Comparing FIGS. 4 and 5 it may be noted that in the "single-phase" energization scheme of FIG. 5 each phase winding is energized only during the intervals of rotor rotation when the self inductance of the phase winding is increasing. For example, referring to FIGS. 4 and 5 it may be noted that the self inductance of phase winding A is increasing over the intervals designated as 43 and 46. Thus, electric current is established in phase winding A during these intervals. Similarly, the self inductance of phase winding B is increasing during the intervals defined by 41, 44 and 47, thus phase B is energized during those intervals and phase C is energized during the intervals designated as 42, 45 and 48.

Because the self-inductance torque contribution is a function of the square of the current, the polarity of the current in the phase winding in the single-phase excitation mode of FIG. 5 is unimportant. In this respect, the energization scheme of FIG. 5 is similar to the switching schemes used with standard "single-tooth" wound switched reluctance machines. Thus, standard switched reluctance machine drives may be used with the machine 30 of FIG. 3.

Figure 6:
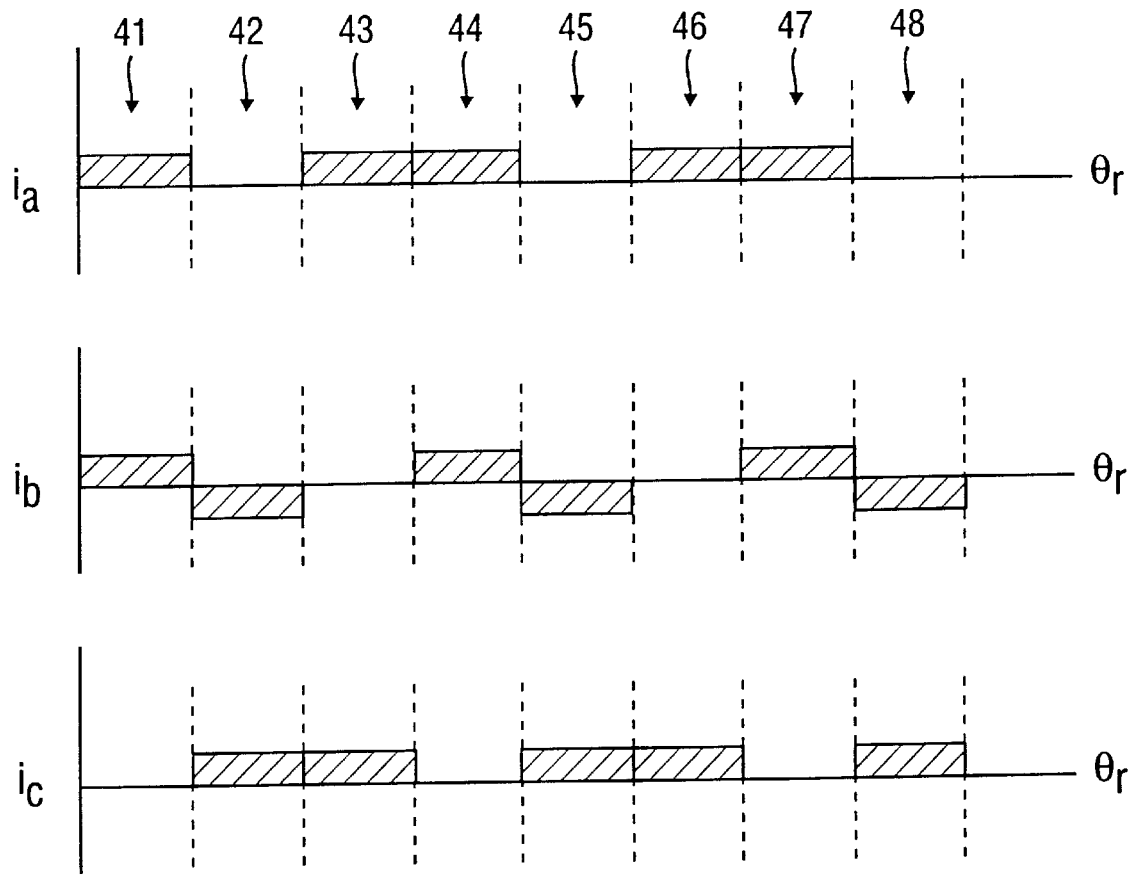
FIG. 6 illustrates an exemplary "two-phase" energization scheme that may be used to drive the machine of FIG. 3 such that two of the phase windings are energized simultaneously.

In addition to the single-phase energization scheme of FIG. 5, a "two-phase" energization scheme in which two of the phase windings are energized simultaneously may be used to provide for torque output that is a combination of both the self inductances of the phase windings and the mutual inductances between the various phase windings. The current waveforms for such a switching scheme are illustrated in FIG. 6. In this switching scheme, each phase winding is energized during: (i) the rotational interval over which its self inductance is increasing (i.e., the same energization intervals used in the scheme of FIG. 5); and (ii) a rotational period during which positive mutual-inductance torque can be produced.

Comparing FIGS. 5 and 6 it may be appreciated that part of the energization scheme (the self inductance portion) overlaps completely with the single-phase excitation scheme of FIG. 5. Thus, phase A continues to be energized during intervals 43 and 46, phase B during intervals 41, 44 and 47, and phase C during intervals 42, 45 and 48. In addition, however, each phase winding is also energized during a period when energization of the phase winding will produce positive mutual-inductance torque.

Referring to FIG. 6 and using phase A an example, phase A is energized during intervals 43 and 46 to produce "self-inductance" torque. Phase A is also energized during the intervals 41, 44 and 47. As reflected in FIG. 4, during these intervals, the mutual inductance between phases A and B is increasing. (Similarly, Phase A is energized during intervals 43 and 46 where the mutual inductance between Phases A and C is increasing.) During the intervals during which phase A is not energized, intervals 42, 45 and 48, the self inductance of the phase A winding is decreasing. Thus, energization of the phase A winding during this period would, regardless of the polarity of the energization current, result in a negative torque contribution as a result of the self inductance of the phase A winding. In the scheme of FIG. 6, the phase A winding is energized during all intervals for which energization of the phase winding would not produce negative self-reluctance torque.

In a manner similar to the energization of phase A, phase C is energized during each interval for which it will not produce negative torque, including intervals 42, 45 and 48 and intervals 43, 46 and 49.

The phase energization scheme of phase B in the two-phase mode of FIG. 6 is similar to that for phases A and C in that phase B is energized during all intervals for which energization of the phase winding would not produce negative torque. Because of the precise arrangement of the fractional-pitched coils that comprise phase winding B, however, the energization of phase B in the energization scheme of FIG. 6 differs slightly from that of phases A and C, in that, while the phase A and B currents are uni-directional, the phase B currents are bi-directional and include currents of both positive and negative polarities. For example, during the intervals of increasing self inductance, intervals 41, 44 and 47, the polarity of the energization current of phase B must be the same as the polarity of the phase current in phase A to obtain a positive mutual-inductance torque contribution since the mutual inductance between phases A and B are increasing during those intervals.

During intervals 42, 45 and 48, however, the self inductance of phase B is not changing (thus, there is no self-inductance torque contribution) but the mutual inductance between phase B and phase C during those intervals is decreasing resulting in a negative derivative of the mutual inductance between phases C and B with respect to rotor position during those intervals. Referring to Equation 1, it may be noted that with a negative mutual-inductance gradient, the product of the current in the two mutually linked windings must be negative to produce positive torques. Thus, for a positive torque contribution, the polarity of the phase current in phase B must be of a polarity opposite that of phase C. Accordingly, during the intervals 42, 45 and 48, the phase energization current for phase B is of a negative polarity in FIG. 6.

The particular two-phase switching scheme of FIG. 6 when used with the machine 30 of FIG. 3 provides for a greater torque output than available with the single-phase switching scheme of FIG. 5 because the total torque contribution at any given time is a function of both the self inductance of an energized phase winding and the mutual inductance between two energized phase windings. This energization scheme, however, requires the use of bi-polar excitation currents for one of the phase windings (winding B in the example) which requires a special type of drive circuit.

Figure 7:
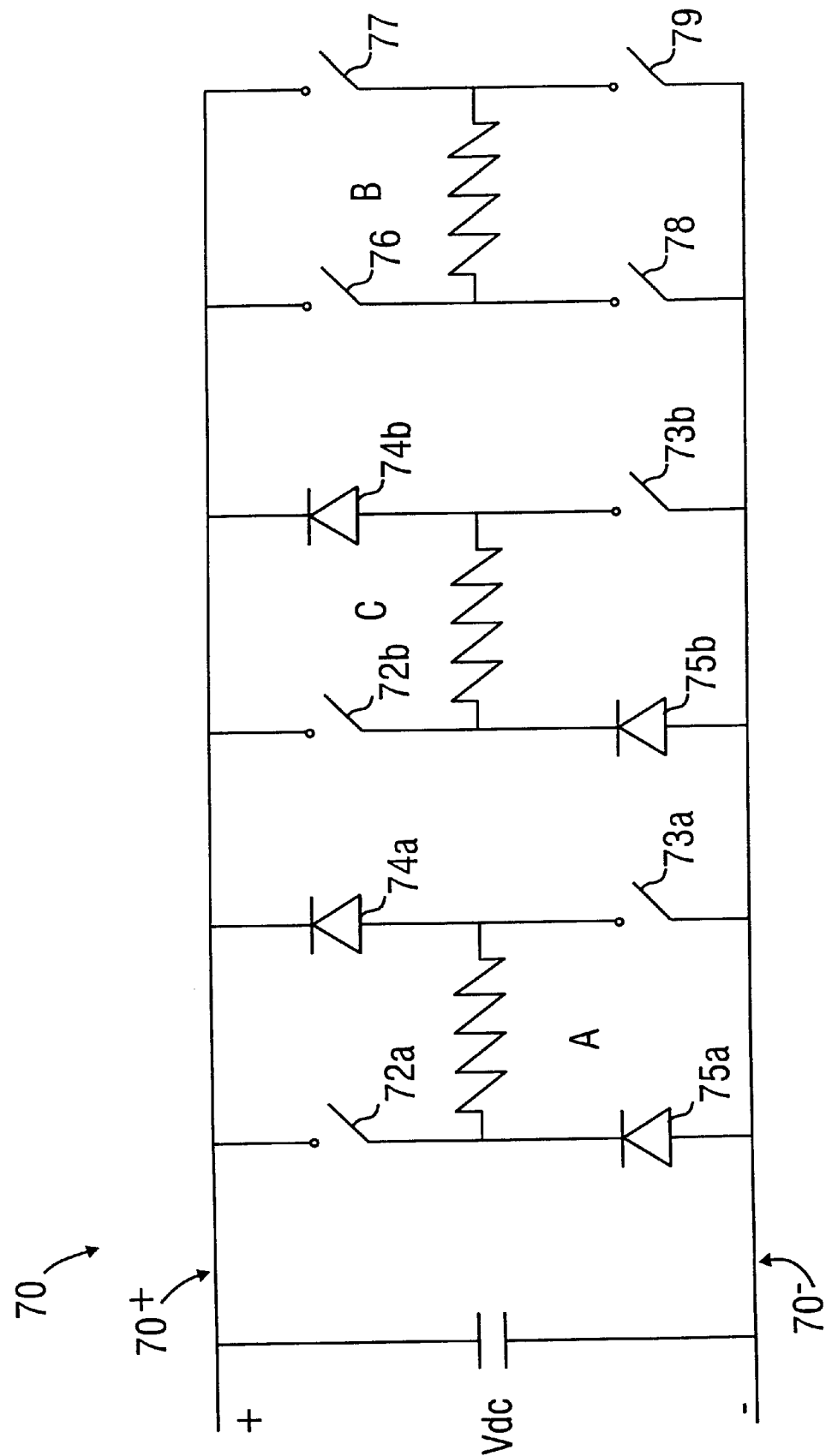
FIG. 7 illustrates an exemplary drive that may be used to implement the energization scheme of FIG. 6 with the machine of FIG. 3.

One exemplary drive that may be combined with the machine 30 of FIG. 3 to implement the energization scheme of FIG. 6 is illustrated in FIG. 7. FIG. 7 illustrates an exemplary drive 70 that includes a DC bus formed from an upper DC bus rail 70+ and a lower DC bus rail 70−. The DC voltage provided across the DC bus may be provided by any suitable source including a battery or an AC-DC converter. A filter capacitor (not illustrated) or other regulating device may be used to store recovered energy provided to the DC bus and/or to stabilize and regulate the DC voltage appearing across the DC bus.

Each of the phase windings A and C is coupled across the DC bus by an upper power switching device 72 and a lower power switching device 73 and upper and lower flyback diodes 74 and 75. The dot on the phase windings in FIG. 7 corresponds to the point in the winding into which positive polarity current would flow.

The power switching devices 72 and 73 may be any suitable power switching device and the precise structure of the devices will vary depending on the size and application of the reluctance machine to which drive 30 is coupled and on the nature of the switching signals applied to the power switching devices. In general, however, the devices may be transistors including bi-polar junction transistors, MOSFETs, IGBTs , and the like, or other suitable power switching devices such as a mechanical switch.

As those of ordinary skill in the art will appreciate from FIG. 7, the switching arrangement used with windings A and C allows for the generation of uni-polar currents in the phase windings. Specifically, actuating the power switching devices 73 and 74 into a conductive state will apply the DC voltage appearing across the DC bus to the appropriate phase winding such that electric current will flow into the phase winding at the point marked with the dot.

The switching arrangement used with phase windings A and C is capable of establishing uni-polar currents. Because bi-polar currents must be established in phase winding B to implement the switching scheme of FIG. 6, a different switching arrangement must be used for that phase. Referring to FIG. 7, the switching arrangement used with the phase B winding in that example is an H-bridge arrangement, including two upper power switching devices 76, 77 and two lower power switching devices 78, 79. The construction of the power switching devices 76–79 may be the same constructions as previously discussed with respect to power switching devices 72 and 73 except that power switching devices 76–79 each require an anti-parallel reverse-recovery diode which may be intrinsic in some types of devices such as MOSFETs. Such anti-parallel diodes are not illustrated but their construction and positions, when necessary, will be apparent to those of ordinary skill in the art.

By appropriately energizing the power switching devices associated with phase winding B, bi-polar currents may be established in the phase B winding. For example, if power switching devices 76 and 79 are actuated into a conductive condition, then the DC voltage across the DC bus will be applied to phase winding B in such a manner that electric current flows into the end of phase winding B marked with a dot in FIG. 7. Thus, this condition results in the production of positive electric current in the phase B winding. In a similar manner, if the power switching devices 77 and 78 are actuated into a conductive condition, the reverse of the voltage across the DC bus will be applied to the phase winding, and electric current will flow into the end of phase winding B opposite that of the end marked with a dot in FIG. 7, thus producing current of a negative polarity in phase winding B.

As those skilled in the art will appreciate, by activating the various power switching devices of drive 70 as a function of rotor position (e.g., by monitoring the angular position of the rotor), the energization scheme of FIG. 6 (and even that of FIG. 5) may be implemented. Additionally, by modulating the actuating signals applied to the power switching devices (e.g., through pulse width modulation or pulse frequency modulate), the magnitudes of the currents in the phase winding may be controlled in such a manner that the rotational speed and/or torque output of the machine to which the drive 70 is coupled may be controlled. The implementation of such control schemes using drive 70 is well within the ability of one of ordinary skill in the art having the benefit of this disclosure and will thus not be addressed herein in greater detail.

In addition to the single-phase and two-phase energization schemes discussed above, the machine 30 of FIG. 3 may also be energized in a "three-phase" mode in which, at any given time, all three-phase windings are energized. One example of such a three-phase energization scheme is illustrated in FIG. 8.

Figure 8:
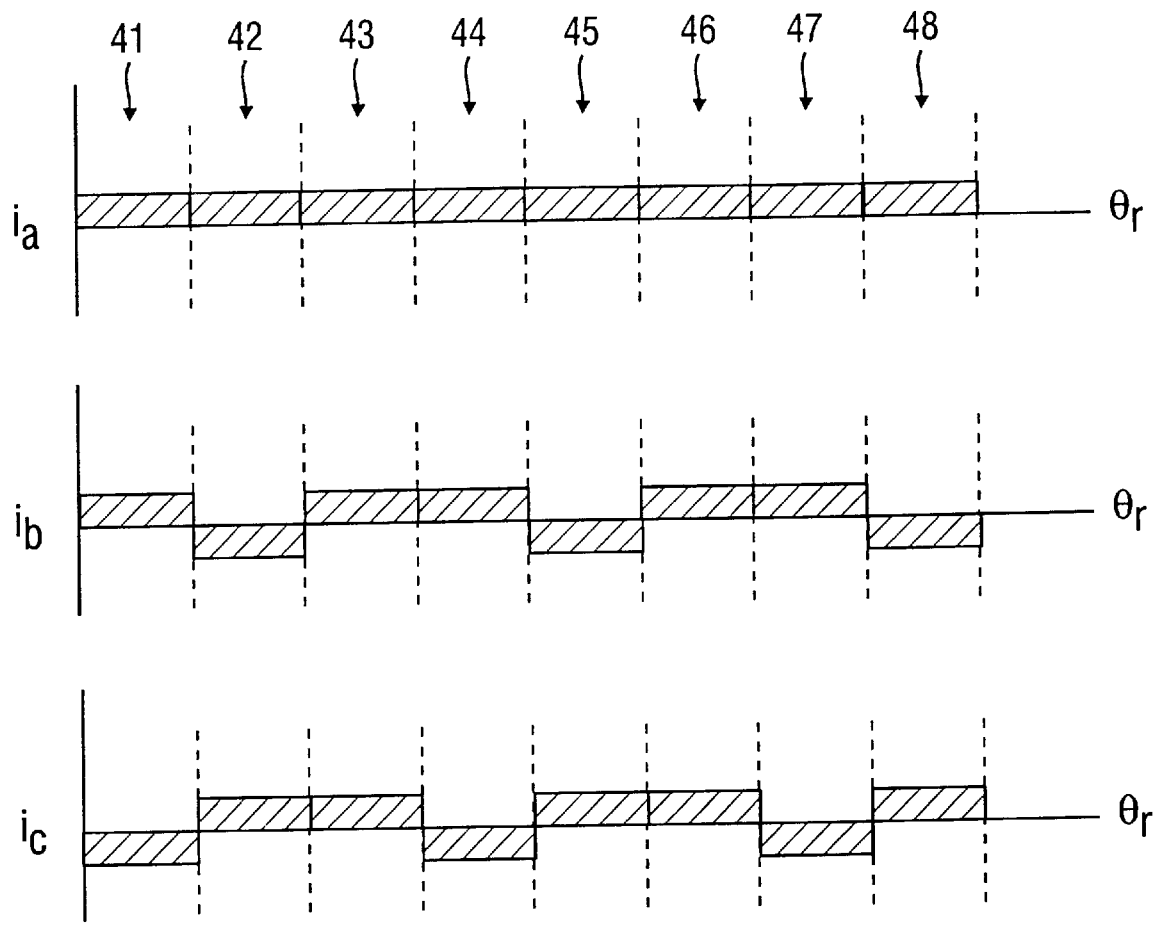
FIG. 8 illustrates an exemplary "three-phase" energization scheme that may be used to drive the machine of FIG. 3 such that three of the phase windings are energized simultaneously.

Referring to FIG. 8, each of the phase windings is energized during intervals corresponding to the "two-phase" energization scheme discussed above. In additional, however, each phase winding is energized during the remaining intervals during which the self inductance of the phase winding is decreasing such that there is a negative self-inductance torque contribution from that phase winding during the remaining intervals. For example, in the switching scheme of FIG. 8, phase winding A is energized during intervals 42, 45, and 48. Referring to FIG. 4, it may be noted that during these intervals the self inductance of phase winding A is decreasing such that there is a negative torque contribution during those intervals from phase A. There is, however, a mutual inductance contribution involving phase A during each of these intervals.

For example, during interval 42, the mutual inductance between phase A and C is zero, but the mutual inductance between phases A and B is negative. Referring to FIG. 8, however, it may be noted that the polarity of the current in phase B during this interval is also negative. Thus, the net mutual-inductance contribution to torque during interval 42 resulting from the mutual inductance between phase A and phase B is positive. By appropriately constructing the coils that comprise the phase windings or by controlling the magnitudes of the current flowing in the phase windings A and B during this interval, it is possible to ensure that the net torque contribution from phase A during the interval 42 is positive. Thus, while continuous energization of phase A results in the production of some negative self-inductance torque, the overall torque contribution resulting from the continuous energization of phase A is positive. In a similar manner, the phase windings B and C are continuously energized to produce a net positive torque during each interval.

To ensure that the net torque produced in each phase winding is positive over each interval using the energization scheme of FIG. 8, the current flowing in one of the phase windings (in the example, phase winding A) should be continuous and of a single polarity and the currents flowing in the other two-phase windings should be bi-polar. As such, traditional uni-polar drives can not be used to drive machine 30 of FIG. 3 according to the switching scheme exemplified by FIG. 8. One exemplary drive which can be used to implement the three-phase energization scheme of FIG. 8 is illustrated in FIG. 9.

Figure 9:
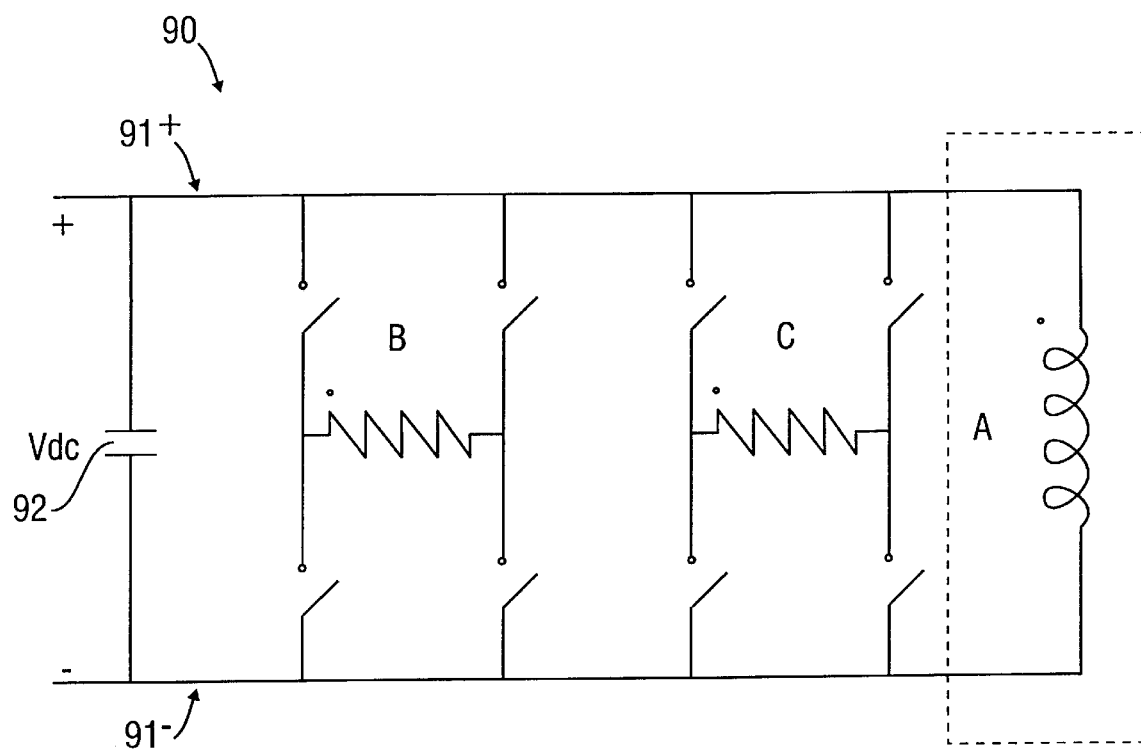
FIG. 9 illustrates an exemplary drive which can be used to implement the three-phase energization scheme of FIG. 8 with the machine of FIG. 1.

FIG. 9 illustrates a drive 90 including a DC bus 91 having a positive bus rail 91+ and a negative bus rail 91−. A DC filter capacitor 92 may be coupled across the DC bus. Because the energization current in phase A for the energization scheme of FIG. 8 is a continuous, uni-polar current, phase A is simply coupled across the DC bus 91. If the magnitude of the current in the phase A winding is to be controlled through pulse width modulation or other suitable techniques, a power switching device and a flyback diode (not illustrated) may be set to couple the phase A winding to the DC bus 91.

Each of phase windings B and C is coupled to the DC by a switching arrangement comprising four power switching devices arranged in an H-bridge configuration. These switching devices may be operated in the manner described above for power switching devices 76–79 of FIG. 7. Notably, the number of switching arrangements for drive 90 is one less than the number of phase windings.

The reluctance machine 30 of FIG. 3 is only one example of the manner in which fractional-pitch windings may be used to provide an improved performance reluctance machine. A further example of an improved reluctance machine utilizing fractional-pitched windings is provided in FIG. 10.

Figure 10:
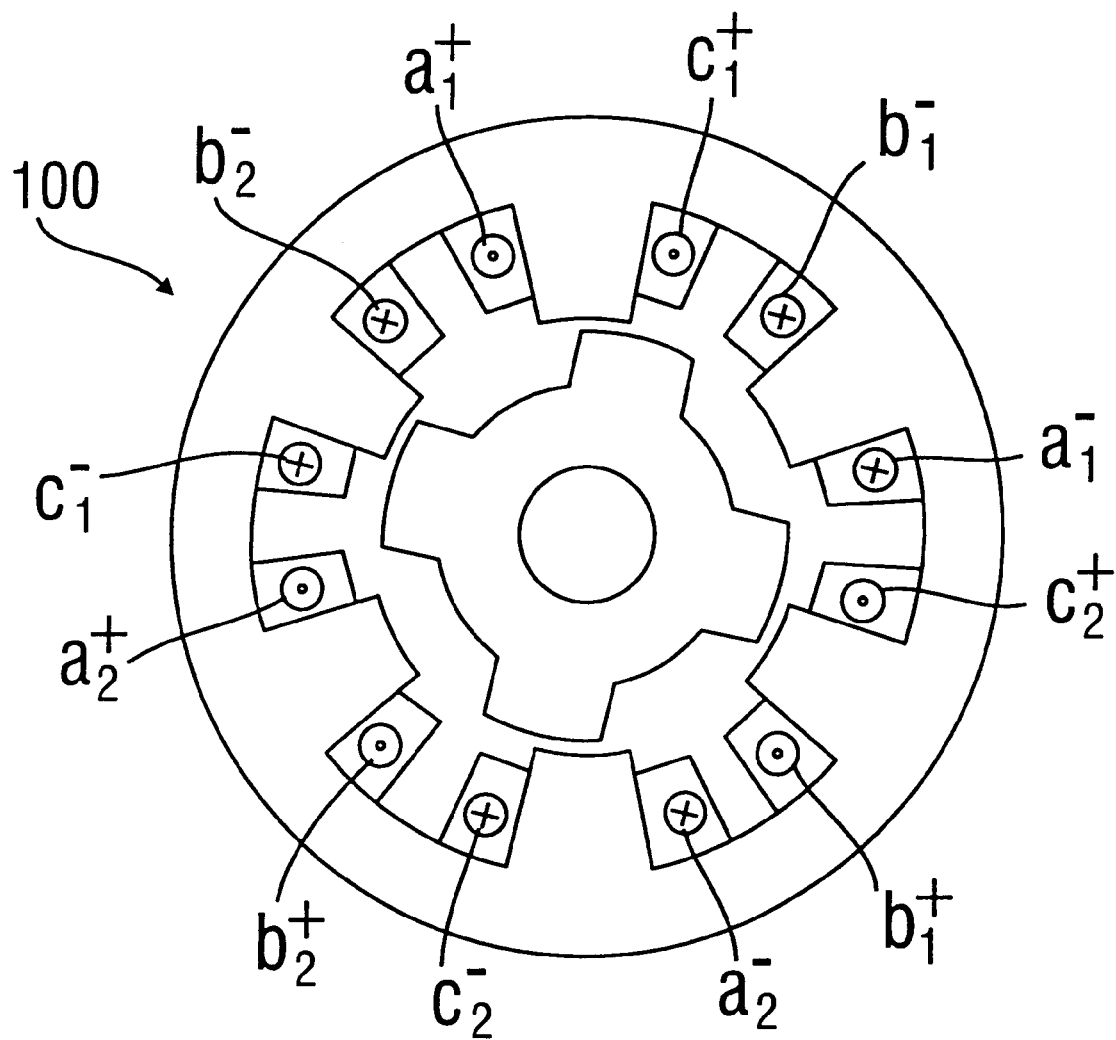
FIG. 10 illustrates an alternate embodiment of a six stator pole, four rotor pole reluctance machine having fractional-pitched windings in accordance with the present invention.

FIG. 10 illustrates a three-phase, six stator pole, four rotor pole reluctance machine whose stator and rotor are constructed in the manner previously described in connection with FIG. 3. In a manner similar to that of FIG. 3, each of the three-phase windings A, B and C comprises two coils where each of the coils is a fractional-pitched coil. The arrangement of the coils of the machine 100 of FIG. 10, however, is different from that of the machine 30 of FIG. 3, primarily in that the coils for the phase B and C windings are placed in the stator in the opposite direction. The precise arrangement of the coils is reflected by the dot and cross-notations of FIG. 10.

Figure 11:
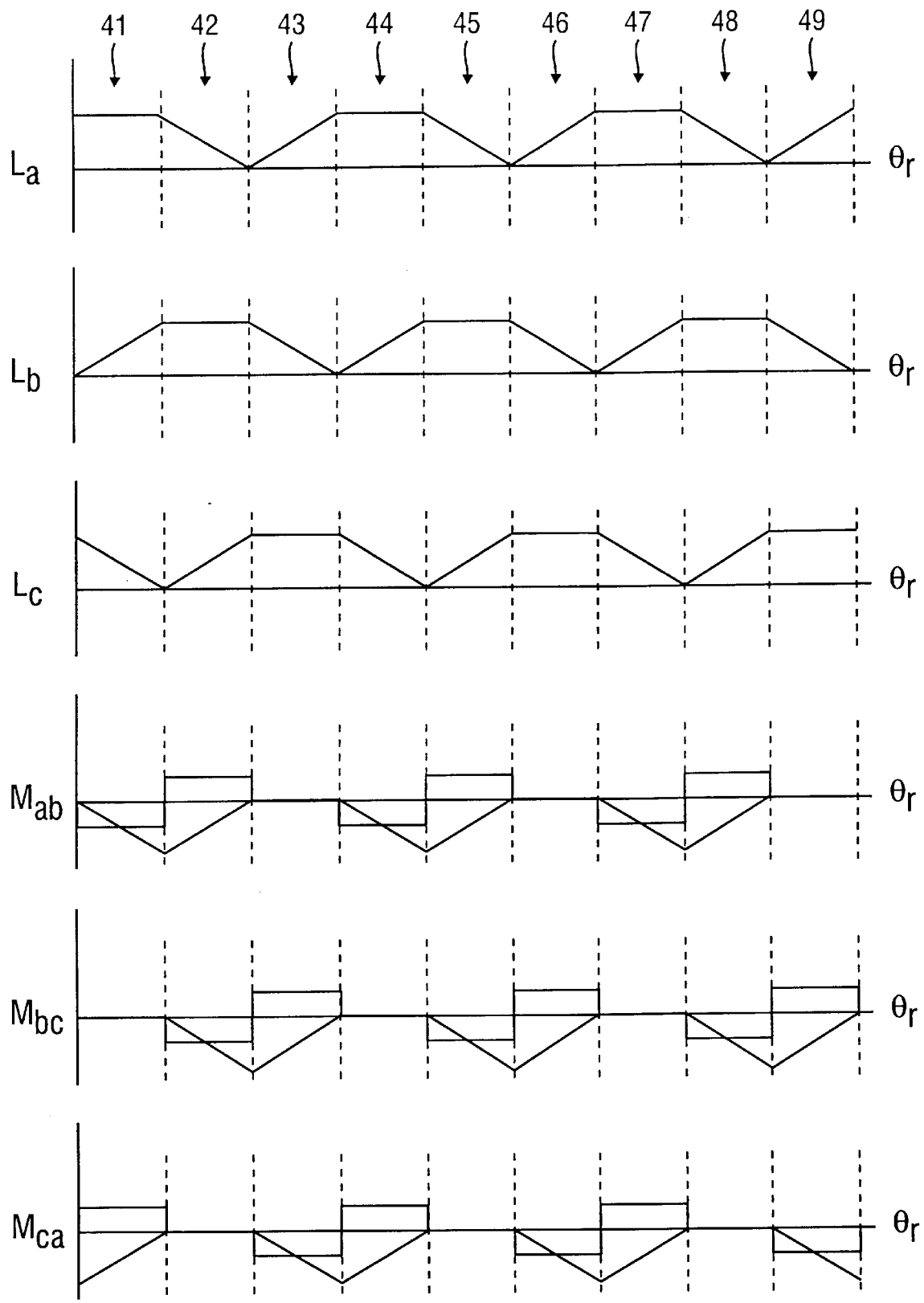
FIG. 11 illustrates the self inductances of the three-phase windings of the machine of FIG. 10 and the mutual inductances between the three-phase windings as a function of the angular position of the rotor.

FIG. 11 illustrates the self and mutual inductances for the three-phase windings A, B and C of the machine 100 of FIG. 10 as a function of the angular position of the rotor. As may be noted from a comparison of FIG. 11 and FIG. 4, the self inductances of the three-phase windings are substantially similar to those of machine 30 of FIG. 3, but the mutual inductances of the machine 100 differ from those of machine 30 primarily in that the mutual inductances for the machine 100 are all negative. In particular, the mutual inductances for machine 100 are "symmetric" in that they are at the same polarity and term but are out of phase by a given amount.

Figure 12:
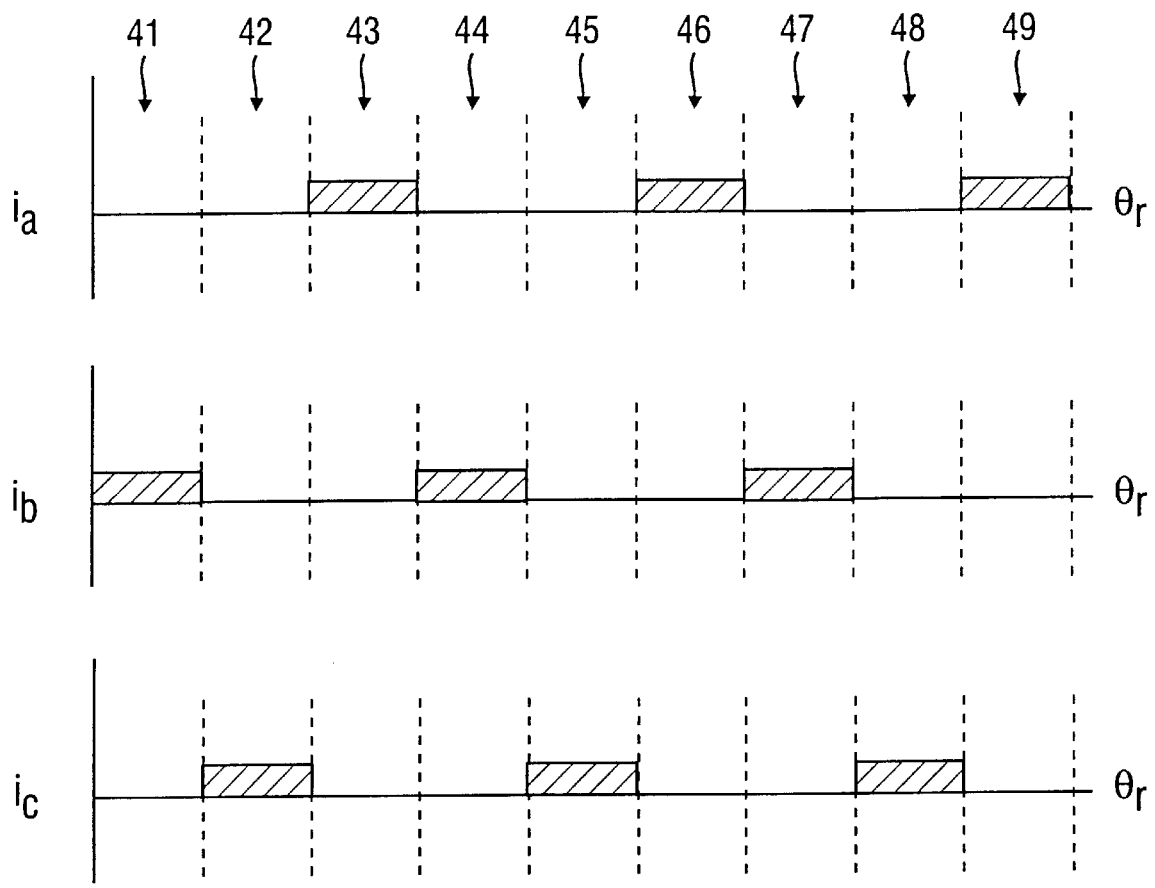
FIG. 12 illustrates an exemplary "single-phase" energization scheme that may be used to drive the machine of FIG. 10 such that only one phase winding is energized at a given time.

Just as the machine 30 of FIG. 3 may be operated in a single-phase mode where all of the torque production is provided from the self inductance of the three-phase windings so, too, may machine 100. Such an exemplary switching scheme for the machine 100 is illustrated in FIG. 12. As may be noted, the single-phase switching scheme for machine 100 is virtually identical to that illustrated in FIG. 5 for machine 30 of FIG. 3. This is because the directionality of the coils that comprise the phase windings does not appreciably affect the self inductance of the phase windings. Standard reluctance drives may be used to implement the switching scheme of FIG. 12.

Figure 13:
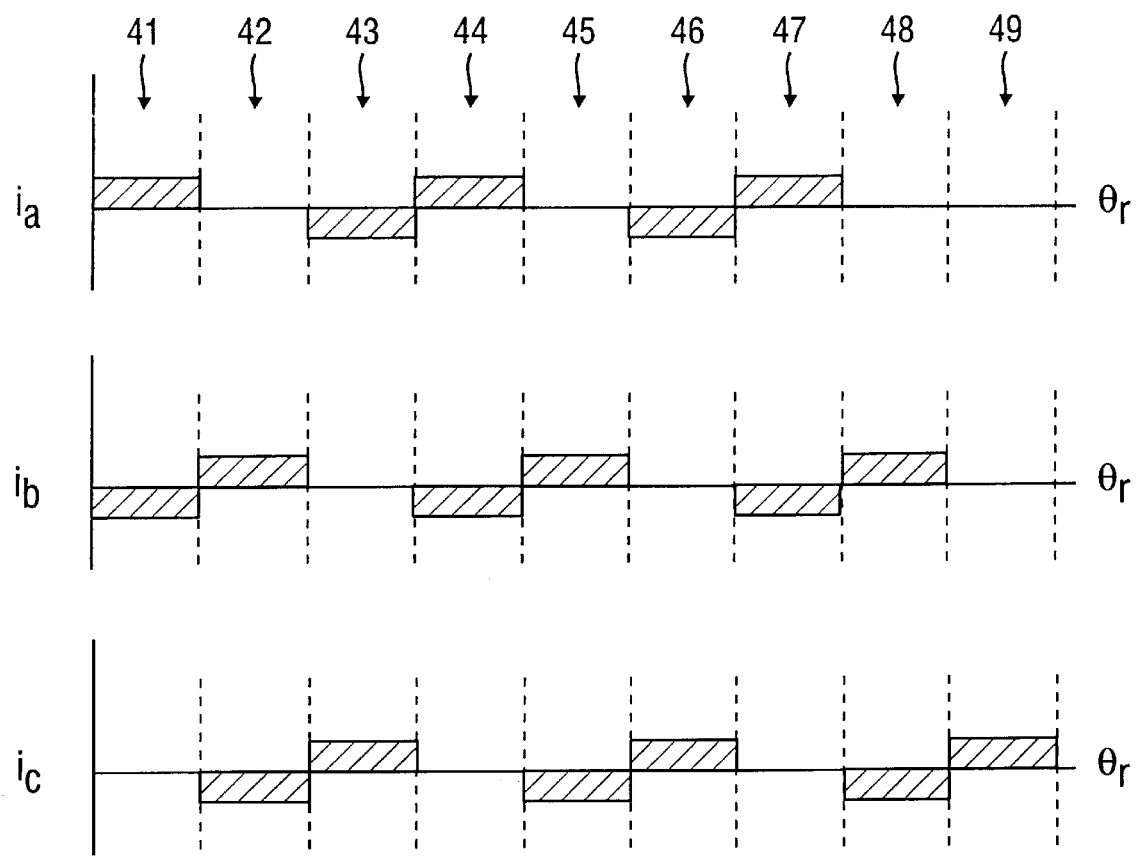
FIG. 13 illustrates an exemplary "two-phase" energization scheme that may be used to drive the machine of FIG. 10 such that two of the phase windings are energized simultaneously.

FIG. 13 illustrates a two-phase switching scheme for machine 100 in which the total torque output of the machine is a contribution of both the self inductance of the phase windings and the mutual inductance between the phase windings. Because the mutual inductances for the machine 100 differ from that of machine 30, the two-phase switching scheme for machine 100 differs from machine 30. Specifically, because of the nature of the windings in machine 100, the two-phase switching scheme allows the phase currents to be "symmetric" to the extent that the energizations currents for the three-phase windings are of the same form but are displaced from one another by a given angular amount. In general, the energization currents should be separated by an angular amount equal to one stator pole pitch. In many applications, the symmetric two-phase energization scheme of FIG. 13 will be easier to implement than that of FIG. 6 because the symmetric nature of the energization currents may allow for a simpler and less costly rotor position transducer and a simpler and less costly control circuit.

Because the energization currents for all three of the phase windings in the energization scheme of FIG. 13 are bi-polar, standard switched reluctance drives cannot be used to implement the switching scheme. A suitable three-phase, bi-polar drive—such as a three-phase full H-bridge drive—can be used. Moreover, because the symmetric energization currents are similar to those found in standard induction motors, a standard induction motor drive may be used with little or no hardware modification to drive machine 100 according to the energization scheme of FIG. 12.

Figure 14:
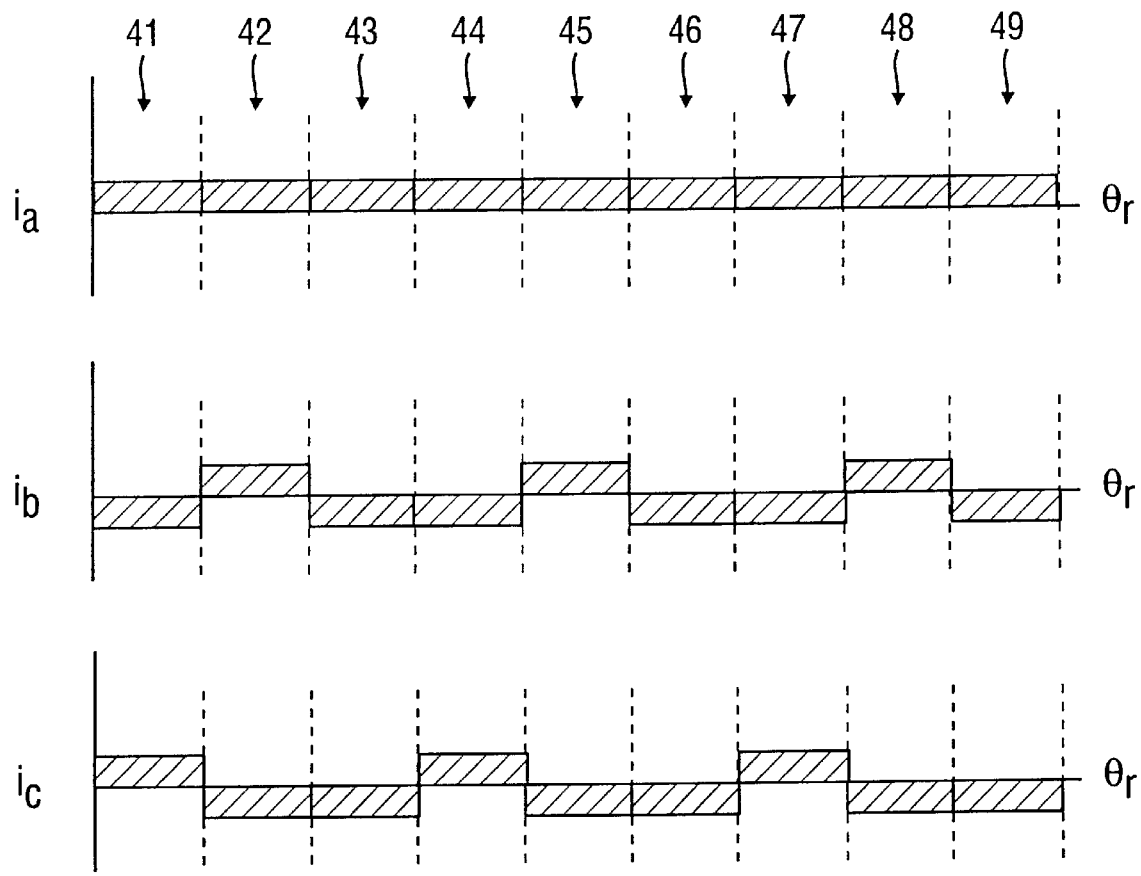
FIG. 14 illustrates an exemplary "three-phase" energization scheme that may be used to drive the machine of FIG. 10 such that three of the phase windings are energized simultaneously.

Two different "three-phase" energization schemes may be used to operate the machine 100 of FIG. 10 such that the totality of its torque output is contributed by the mutual inductances among the three-phase windings. One such switching scheme, illustrated in FIG. 14, is similar to that of FIG. 8 for machine 30. In both instances, the phase energization current for phase winding A is continuous. Because the directionality of the coils comprising phases B and C of machine 100 of FIG. 10 is opposite that of the coils comprising phases B and C of machine 30, the polarity of the phase energization currents for phase windings B and C of machine 100 in the energization scheme of FIG. 14, at any time during phase energization, is opposite that of the phase energization currents for phases A and B in the energization scheme of FIG. 8. The drive 90 of FIG. 9 may be used to implement the energization scheme of FIG. 14 with the machine 100 of FIG. 10.

Figure 15:
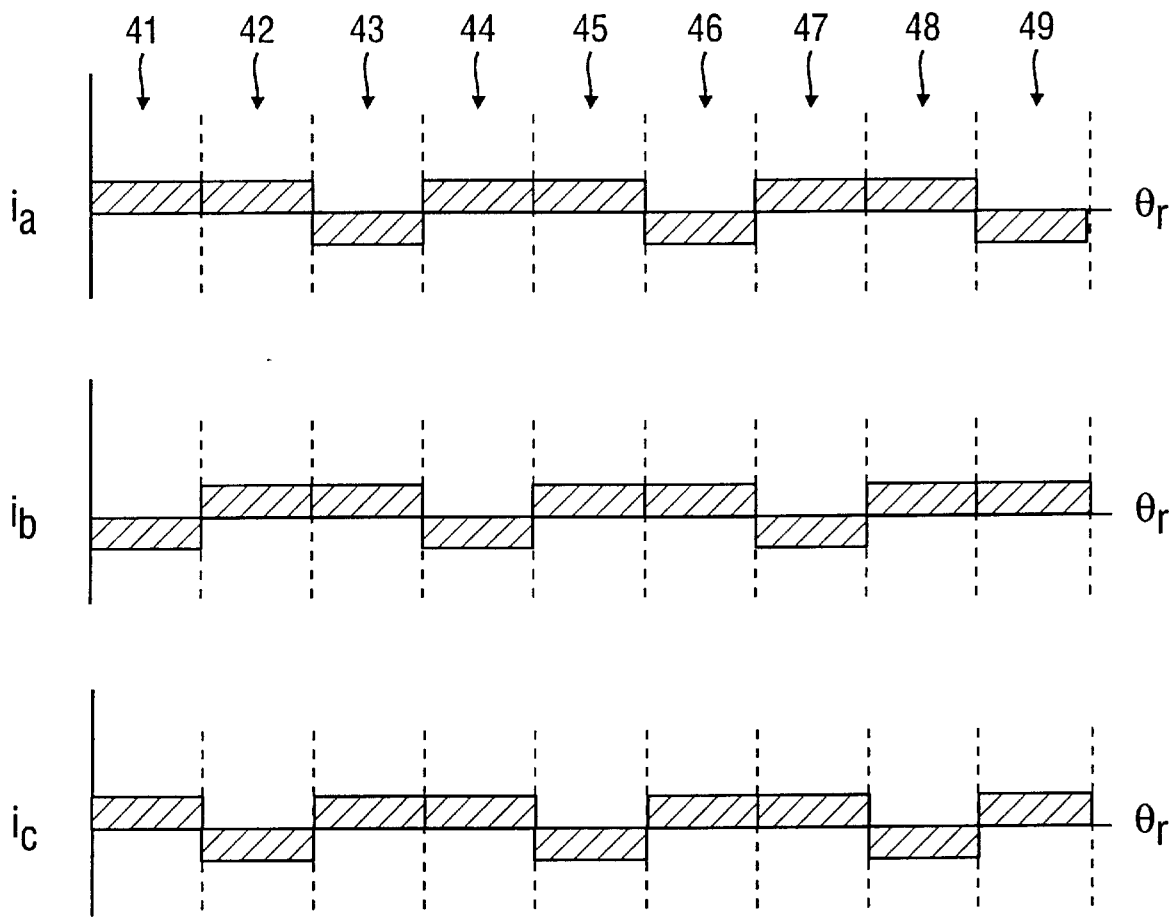
FIG. 15 illustrates an alternate exemplary "three-phase" energization scheme that may be used to drive the machine of FIG. 10 such that three of the phase windings are energized simultaneously.

An alternate three-phase switching scheme for machine 100 is illustrated in FIG. 15. In this energization scheme, the energization currents for the three phase Windings are identical but are out of phase from one another by a constant angular amount, which in the example is one stator pole pitch. Any drive capable of establishing three-phase bi-polar currents—such as a full H-bridge or a traditional induction motor drive—may be used to establish the energization currents illustrated in FIG. 15. As with the two-phase energization scheme of FIG. 13, the energization currents for the three-phase energization scheme of FIG. 15 are symmetric, thus potentially reducing the complexity of the rotor position transducer and control circuitry that would otherwise be required to implement a non-symmetric switching scheme.

The six stator pole/four rotor pole machines of FIGS. 3 and 10 discussed above are exemplary of fractional-pitch reluctance machines in accordance with the present invention. Fractional-pitch windings may also be used with reluctance machines having different stator pole/rotor pole combinations. For example, FIG. 16 illustrates an exemplary reluctance machine in accordance with the present invention having twelve stator poles and eight rotor poles.

The machine 160 of FIG. 16 has a twelve pole stator 162 and an eight pole rotor 164 that may be constructed in the manner previously described in connection with the rotor and stator of machine 30 of FIG. 3. Three phase windings A, B and C are placed within the stator 162 and each phase winding comprises four fractional-pitch coils arranged as illustrated in FIG. 16. As with the coils of machines 30 and 100, the coils that comprise a given phase winding may be coupled together in a series or parallel relationship.

Figure 16:
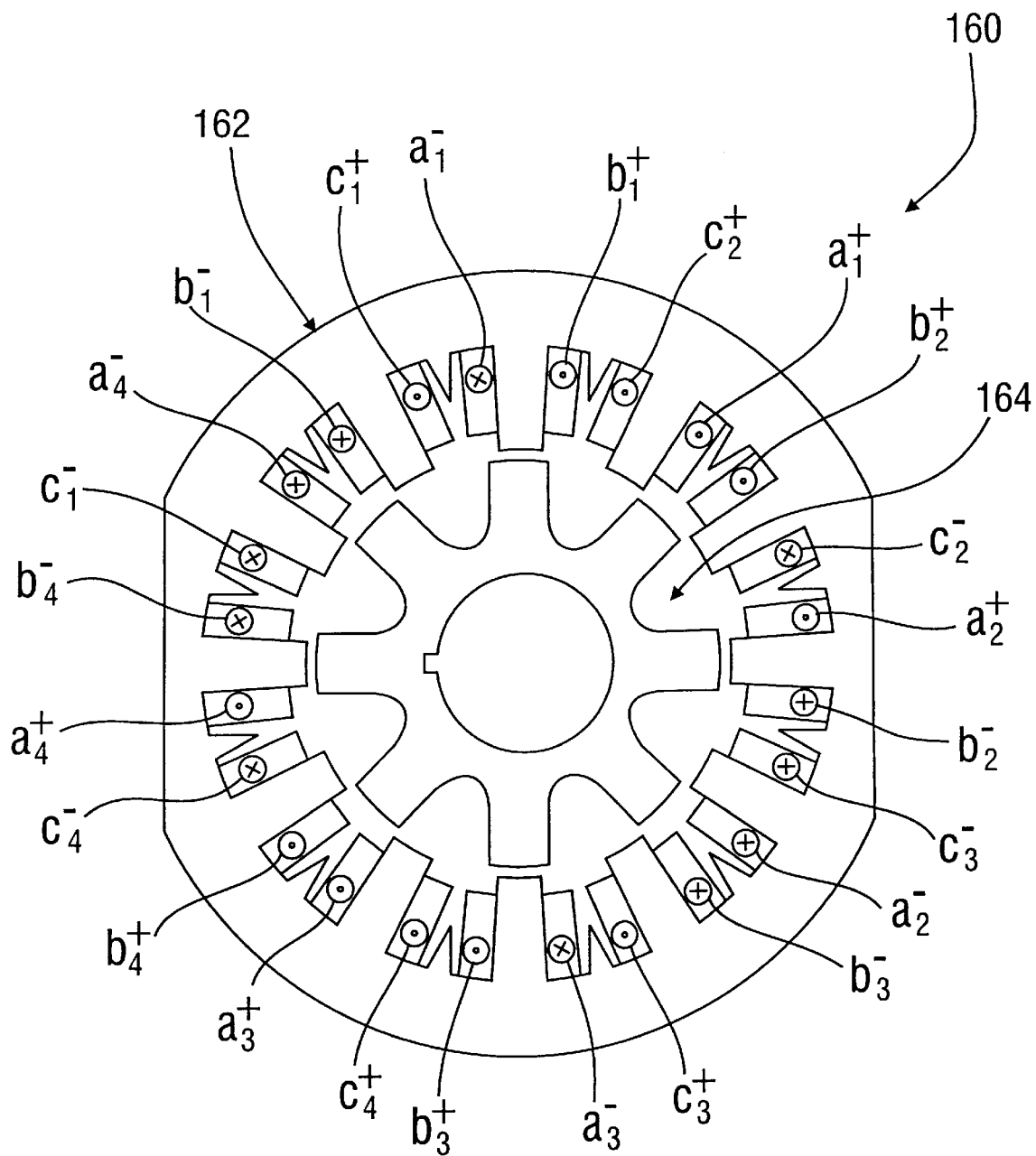
FIG. 16 illustrates an exemplary twelve stator pole, eight rotor pole reluctance machine having fractional-pitched windings in accordance with the present invention.

The machine 160 of FIG. 16 is similar to machine 30 of FIG. 3 in that energization of the machine according to a two-phase or three-phase energization scheme requires non-symmetric phase currents akin to those illustrated in the switching schemes associated with machine 30. The non-symmetric nature of the machine 160 depends from the manner in which the fractional-pitched coils are placed within the machine. In the machine of FIG. 16, the coils are placed within the stator such that the mutual inductances between the three phase windings are not symmetric.

Because multi-phase energization of the machine 160 will require bi-polar currents in all three of the phase windings, a suitable three-phase, bi-polar current drive (e.g., a three-phase H-bridge with four switches per phase) may be used to drive machine 160.

Figure 17:
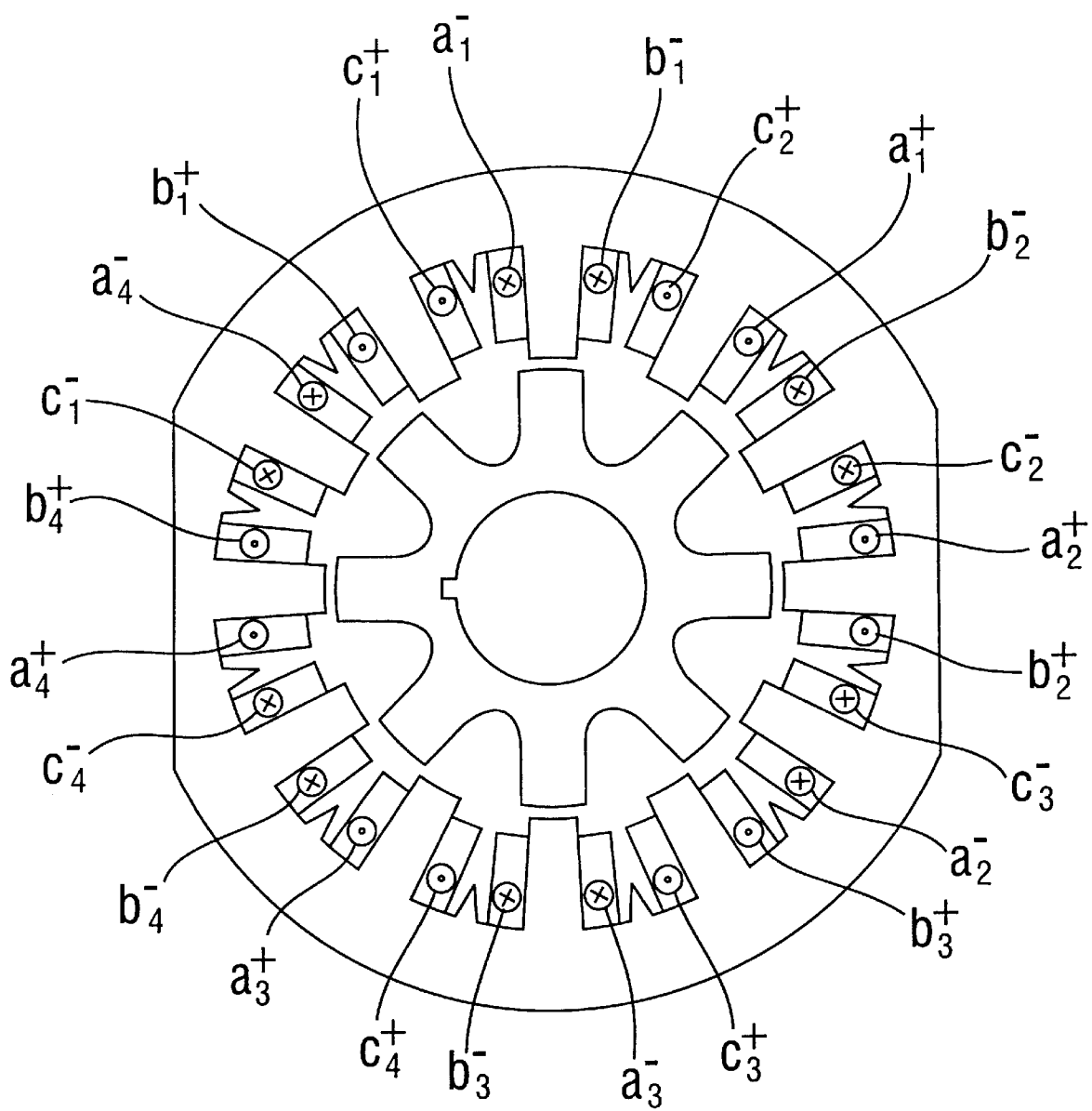
FIG. 17 illustrates an alternate twelve stator pole, eight rotor pole reluctance machine in accordance with the present invention having fractional-pitched windings in accordance with the present invention.

FIG. 17 illustrates an alternate designed for a fractional-pitched twelve stator pole, eight rotor pole machine 170. Machine 170 has a rotor and a stator that are constructed in a manner substantially identical to that of machine 160, but the coils that comprise the three phase windings are placed within the stator in a different manner as reflected by FIG. 17. The fractional-pitched winding arrangement used in machine 170 is "symmetric" in that the mutual inductances (and thus the energization currents for acceptable two- and three-phase energization schemes) are symmetric. In this manner, machine 170 is similar to machine 100 of FIG. 10.

Just as with machine 160, machine 170 may be energized according to single-phase, two-phase and three-phase energization schemes. A standard H-bridge drive with four switches per phase may be used to drive machine 160. Moreover, because of the symmetric nature of machine 170, a symmetric inverter having only six power switching devices may be used to drive machine 170. One example of a system having such a drive is illustrated in FIG. 18.

Figure 18:
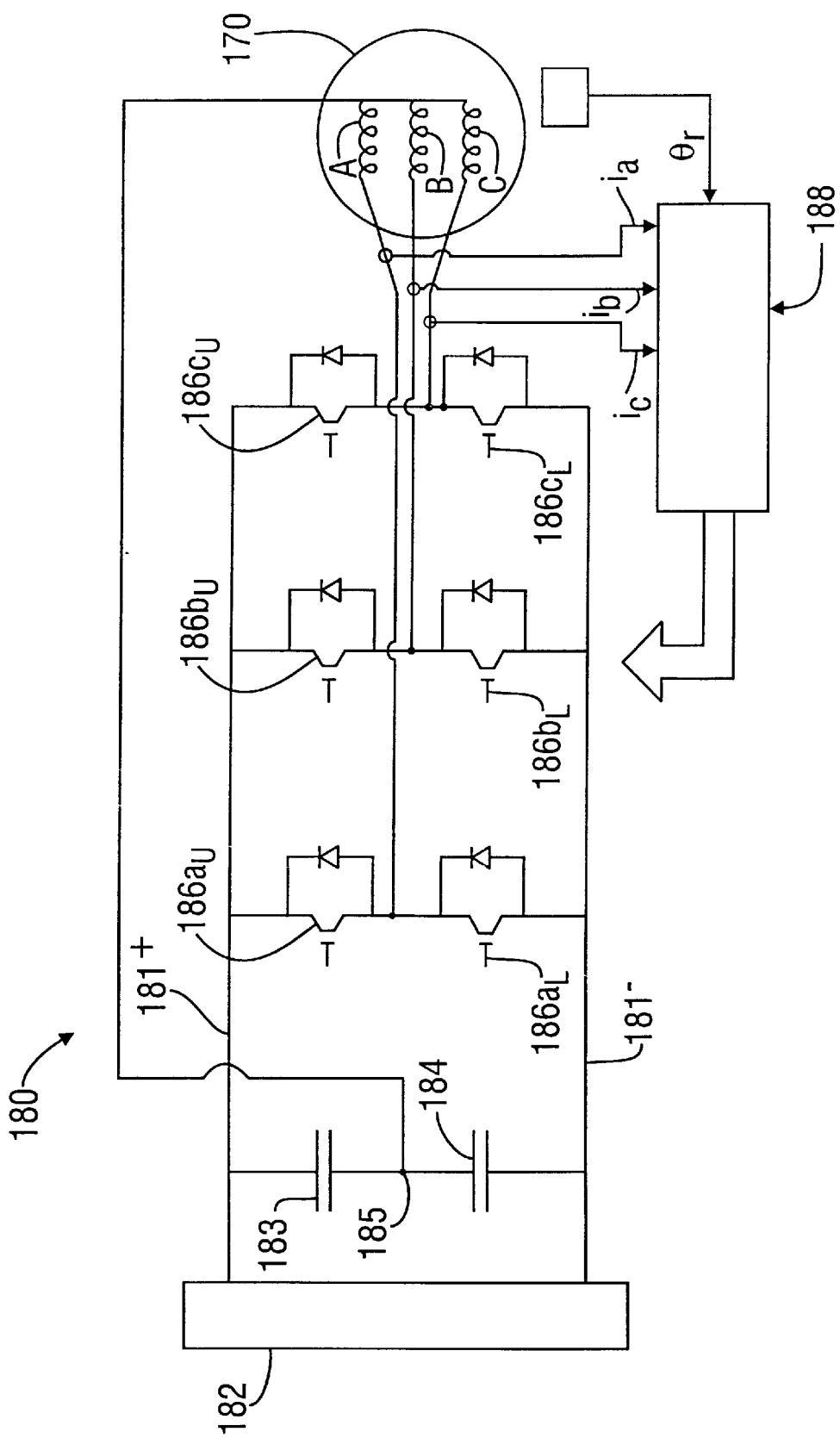
FIG. 18 illustrates a symmetric drive that may be used to drive the reluctance machine of FIG. 17.

FIG. 18 illustrates a symmetric drive 180 having a DC bus 181 that defines a positive rail 181+ and a negative rail 181−. A DC voltage is provided to the DC bus by a DC power supply 182 that may be a DC battery, an AC-DC converter, or other suitable source of DC power. Coupled across the rails of DC bus 181 are an upper DC capacitor 183 and a lower DC capacitor 184. The capacitors 183 and 184 are coupled together at a common point 185. Also coupled across the DC bus are sets of power switching devices 186. Each set of power switching devices is associated with one of the three-phase windings A, B and C of reluctance machine 170, and each set of power switching devices comprises an upper power switching device and a lower power switching device. As with the power switching devices described above, the power switching devices comprising sets 186 may be transistors, mechanical devices or the like. In general, the power switching devices should also provide a return path for current when the power switching device is actuated in a non-conductive state. For certain types of devices (e.g., power MOSFETs), this return path will be available because of the intrinsic diode such devices provide. For other types of devices, it may be necessary to add a flyback diode across the power switching devices. In the example of figure 180, the power switching devices comprising sets 186 are illustrated as consisting of a transistor switch and a diode, although the diode may be the intrinsic diode of the transistor.

Coupled to the junction of the two power switching devices of each set 186 is one end of one of the phase windings A, B and C of machine 170. The other ends of the three phase windings are coupled together in a star configuration, and the junction point for the three phase windings is brought out and electrically coupled to junction 185.

A controller and current regulator 188 receives current feedback signals indicative of the current in the phase windings and signals from a rotor position transducer 189 representing the angular position of the rotor. In response to the output signals from the rotor position transducer 189 and the current feedback signals the controller 188 generates gating signals used to drive the power switching devices comprising sets 186. The precise nature and form of the switching signals will vary depending on the energization scheme selected to drive machine 170 and can be derived by one of ordinary skill in the art having the benefit of this disclosure.

The symmetric drive 180 may also be used to drive the symmetric machine 100 of FIG. 10, previously described.

Although not illustrated, the drive 180 of FIG. 18 may be used to drive a machine where the common connection between the three-phase phase windings is left floating rather than connected to the common junction 185.

The fractional-pitch machines illustrated and described herein provide significant advantages over traditional single-tooth and fully-pitched reluctance machines. In particular, the costs for constructing a fractional-pitch machine in accordance with the present invention is often less than that for a comparable fully-pitched or single-tooth machine both in terms of copper and in terms of steel. Moreover, because of the use of both self and mutual inductances for torque production, a smoother torque output with minimal torque ripples may be obtained and the torque output is increased resulting in a higher torque density. Still further, the symmetric, bi-polar energization schemes that may be used with fractional-pitch machines in accordance with the present invention allow for the use of standard induction motor pulse width modulation inverters to drive the machines with little or no hardware modification.

The above description of several exemplary embodiments is made by way of example and not for purposes of limitation. Many variations may be made to the embodiments and methods disclosed herein without departing from the scope and spirit of the present invention. For example, the present invention is applicable to a number of reluctance machine embodiments, having various phase, stator pole/rotor pole combinations and to reluctance machines having rotor configurations different from those exemplified in this application. The present invention is intended to be limited only by the scope and spirit of the following claims.

We claim as our invention:

1. A stator for a reluctance machine comprising:
   a plurality of stator poles; and
   a plurality of phase windings positioned within the stator wherein each phase winding comprises at least one fractional-pitched coil, and each fractional-pitched coil surrounds a pair of adjacent stator poles.

2. The stator of claim 1 wherein the phase winding comprises a plurality of fractional-pitched coils that are electrically coupled in parallel.

3. The stator of claim 1 wherein each phase winding comprises a plurality of fractional-pitched coils that are electrically coupled in series.

4. The stator of claim 3 wherein the stator defines six stator poles.

5. The stator of claim 3 wherein the stator defines twelve stator poles.

6. The stator of claim 1 wherein the coils for the phase windings are positioned within the stator such that the mutual inductances between the respective phase windings are symmetric.

7. The stator of claim 1 wherein the coils for the phase windings are positioned within the stator such that the mutual inductances between the respective phase windings are non-symmetric.

8. A reluctance machine comprising:
   a stator defining a plurality of stator poles and a plurality of inter pole gaps;
   a rotor defining a plurality of rotor poles and a plurality of inter pole gaps;
   a plurality of phase windings, each phase winding having conductive portions positioned within the inter pole gaps of the stator such that each gap includes conductive portions from at least two different phase windings, the phase windings including at least one fractional-pitched phase winding positioned within the stator, wherein the fractional-pitched phase winding comprises a plurality of fractional-pitched coils.

9. The reluctance machine of claim 8 wherein the stator defines six stator poles and the rotor defines four rotor poles and each coil encircles two stator poles.

10. The reluctance machine of claim 9 wherein there are three phase windings and each phase winding comprises two fractional-pitch coils.

11. The reluctance machine of claim 10 wherein the mutual inductances between the respective phase windings are symmetric.

12. The reluctance machine of claim 10 wherein the mutual inductances between the respective phase windings are non-symmetric.

13. The reluctance machine of claim 8 wherein the stator defined twelve stator poles and the rotor defines eight rotor poles.

14. The reluctance machine of claim 13 wherein there are three phase windings, each phase winding comprises four fractional-pitched coils and wherein each coil encircles two stator poles.

15. The reluctance machine of claim 14 wherein the coils are positioned within the stator such that the mutual inductances between the phase windings are symmetric.

16. The reluctance machine of claim 14 wherein the coils are positioned within the stator such that the mutual inductances between the phase windings are non-symmetric.

17. A reluctance machine system comprising:
   a stator defining a plurality of stator poles and inter pole gaps;
   a rotor defining a plurality of rotor poles and inter pole gaps;
   a plurality of phase windings where each phase winding comprises a plurality of fractional-pitched coils, and where each phase winding has conductive portions positioned within the inter pole gaps of the stator such that each gap includes conductive portions from at least two different phase windings; and
   a power drive operable to energize one of the plurality of phase windings at a given time.

18. The reluctance machine system of claim 17 wherein the power drive comprises a full H-bridge drive where there are four power switching devices associated with each of the drive outputs.

19. The reluctance machine system of claim 17 wherein the power drive comprises a half H-bridge drive where there are two power switching devices associated with each of the drive outputs.

20. The reluctance machine system of claim 17, wherein the plurality of phase windings comprises three phase windings.

21. A reluctance machine system comprising:

a stator defining a plurality of stator poles and inter pole gaps;

a rotor defining a plurality of rotor poles and inter pole gaps;

a plurality of phase windings where each phase winding comprises a plurality of fractional-pitched coils and where each phase winding has conductive portions positioned within the inter pole gaps of the stator such that each gap includes conductive portions from at least two different phase windings; and a power drive operable to energize at least two of the plurality of phase windings simultaneously.

22. The reluctance machine system of claim 21, wherein the plurality of phase windings comprises three phase windings.

23. The reluctance machine system of claim 21, wherein the power drive is configured to provide bi-polar excitation current to at least one of die phase windings.

24. The reluctance machine system of claim 21, wherein the power drive energizes a given one of the plurality of phase windings during (i) a rotational period over which the self inductance of the given phase winding is increasing, and (ii) a rotational interval during which positive mutual-inductance torque can be produced between the given phase winding and at least another one of the plurality of phase windings.

25. The reluctance machine system of claim 21, wherein the power drive energizes all of the phase windings simultaneously.

26. The reluctance machine system of claim 21, wherein the power drive energizes one of the phase windings continuously.

* * * * *

UNITED STATES PATENT AND TRADEMARK OFFICE
CERTIFICATE OF CORRECTION

PATENT NO. : 6,078,122
DATED : June 20, 2000
INVENTOR(S) : Yifan Tang and Yue Li It is certified that error appears in the above-identified patent and that said Letters Patent is hereby corrected as shown below:

Foreign Patent Documents:

Please delete "5-219786" and insert therefore --5-219786 A--.

Other Publications:

Stephenson and Blake, please delete "Application" and insert therefore --Applications--.

In the Claims:

Claim 23, column 16, line 6, delete "die" and insert therefore --the--.

Signed and Sealed this

First Day of May, 2001

Attest:

NICHOLAS P. GODICI

*Attesting Officer*   *Acting Director of the United States Patent and Trademark Office*